United States Patent [19]

Morlion et al.

[11] Patent Number: 5,655,045
[45] Date of Patent: Aug. 5, 1997

[54] ALIGNMENT PIECE FOR OPTICAL CONDUCTORS

[75] Inventors: Danny Morlion, St. Amandsberg; Jan Peter Karel Van Koetsem, Zwijndrecht; Luc Jonckheere, Dilbeek, all of Belgium

[73] Assignee: Framatome Connectors International, Courbevoie, France

[21] Appl. No.: 601,256

[22] Filed: Feb. 14, 1996

[30] Foreign Application Priority Data

Feb. 21, 1995 [NL] Netherlands .................. 9500329

[51] Int. Cl.⁶ .................................................. G02B 6/00
[52] U.S. Cl. .................. 385/137; 385/14; 385/52; 385/70; 385/71; 385/76; 385/77; 385/83; 385/136
[58] Field of Search .................. 385/14, 49, 52, 385/55, 56, 65, 70, 71, 76, 77, 83, 87, 97, 98, 134, 136, 137, 147

[56] References Cited

U.S. PATENT DOCUMENTS

| 4,045,121 | 8/1977 | Clark ............................ 385/70 X |
| 4,818,059 | 4/1989 | Kakii et al. ................... 385/83 X |
| 5,155,787 | 10/1992 | Carpenter et al. .............. 385/98 |
| 5,185,846 | 2/1993 | Basavanhally et al. ......... 385/51 X |
| 5,216,741 | 6/1993 | Blijeven et al. ............... 385/137 |
| 5,381,496 | 1/1995 | Morlion et al. ................ 385/75 |
| 5,400,426 | 3/1995 | De Jong et al. ................ 385/95 |
| 5,416,882 | 5/1995 | Hakoun et al. ................. 385/136 |
| 5,440,657 | 8/1995 | Essert ........................... 385/71 |
| 5,519,798 | 5/1996 | Shahid et al. .................. 385/65 |
| 5,555,331 | 9/1996 | Billet et al. ................... 385/49 |

FOREIGN PATENT DOCUMENTS

| 0497011 A1 | 8/1992 | European Pat. Off. ......... 385/70 X |
| 0530875 A1 | 3/1993 | European Pat. Off. ......... 385/70 X |
| 0571037 A1 | 11/1993 | European Pat. Off. ......... 385/70 X |
| 0602726 A1 | 6/1994 | European Pat. Off. ......... 385/70 X |
| 2660442 A1 | 10/1991 | France ........................... 385/70 X |
| 684217 A5 | 7/1994 | Switzerland .................... 385/70 X |

*Primary Examiner*—Brian Healy
*Attorney, Agent, or Firm*—Perman & Green

[57] ABSTRACT

An alignment piece for optical conductors comprises a support plate, a guiding plate made with very high accuracy, one or more alignment channels for the conductors, which alignment channels have ends formed in the guiding plate, a first positioning element and a first positioning means formed in the guiding plate and holding the first positioning element at a predetermined location with respect to the ends of the alignment channels. The first positioning element has a supporting zone engaging the conductors. The alignment piece comprises a second positioning element and a second positioning means formed in the alignment piece at the side of the first positioning element opposite of the ends of the alignment channels and holding the second positioning element at a predetermined location with respect to the ends of the alignment channels. The second positioning element has a supporting zone clamping the conductors in the alignment piece, wherein the supporting zones of both positioning elements and the ends of the alignment channels determine the angle of inclination of the conductors in the alignment piece.

4 Claims, 3 Drawing Sheets

ALIGNMENT PIECE FOR OPTICAL CONDUCTORS

BACKGROUND OF THE INVENTION

The invention relates to an alignment piece for optical conductors, comprising a support plate, a guiding plate manufactured with very high accuracy, one or more alignment channels for the conductors, said alignment channels having ends formed in the guiding plate, a first positioning element and a first positioning means formed in the guiding plate and holding the first positioning element at a predetermined location with respect to the ends of the alignment channels, wherein the first positioning element has a supporting zone engaging the conductors.

Such an alignment piece is described in the earlier international patent application PCT/EP95/02403 and earlier European patent application 95202395 of the same applicant. International patent application PCT/EP95/02403 discloses that the optical conductors are provided in the alignment channels of the alignment piece and are then attached in the alignment piece by embedding. For an optimal connection between the optical conductors of connectors to be interconnected it is important that the conductors are fixed in the alignment piece under a predetermined angle of inclination. To this end the alignment piece according to European patent application 95202395 is provided with a first positioning element which at its location determined by the first positioning means, accurately determines the angle of inclination of the conductors in the alignment piece in cooperation with the ends of the alignment channels.

The invention aims to provide an alignment piece of the above-mentioned type wherein the angle of inclination of the optical conductors in the alignment piece is determined with increased accuracy.

SUMMARY OF THE INVENTION

To this end the alignment piece of the invention is characterized by a second positioning element and a second positioning means formed in the alignment piece at the side of the first positioning element opposite of the ends of the alignment channels and holding the second positioning element at a predetermined location with respect to the ends of the alignment channels, wherein the second positioning element has a supporting zone clamping the conductors in the alignment piece, wherein the supporting zones of both positioning elements and the ends of the alignment channels determine the angle of inclination of the conductors in the alignment piece.

The second positioning element and the second positioning means determine the distance from the point where the conductors are clamped in the alignment piece to the ends of the alignment channels and the height difference between these two locations. Thereby the angle of inclination of the conductors leaving the ends of the alignment channels, can be determined with very high accuracy.

BRIEF DESCRIPTION OF THE DRAWINGS

The invention will be further explained by reference to the drawings in which two embodiments of the alignment piece according to the invention are schematically shown.

DETAILED DESCRIPTION OF THE PREFERRED EMBODIMENTS

Figure 1:
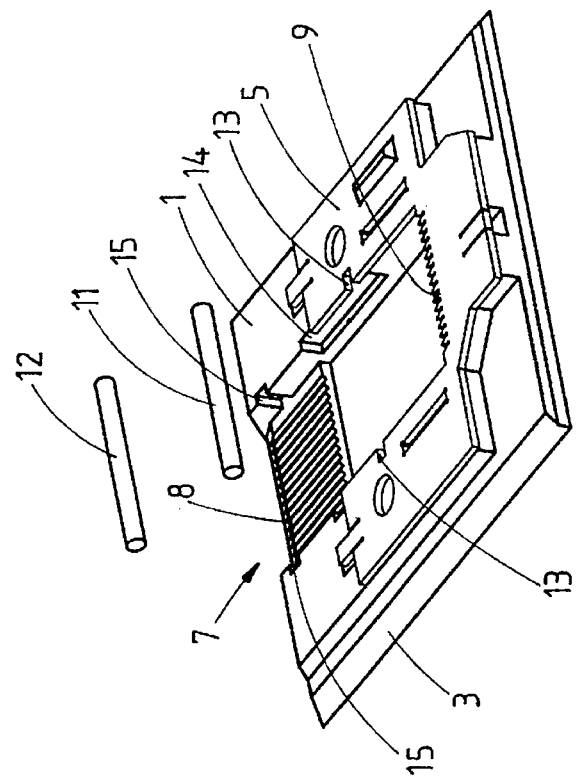
FIG. 1 shows a perspective view of a first embodiment of an alignment piece according to the invention to be embedded in a printed circuit board, wherein both positioning elements are shown separated from the alignment piece.
Figure 2:
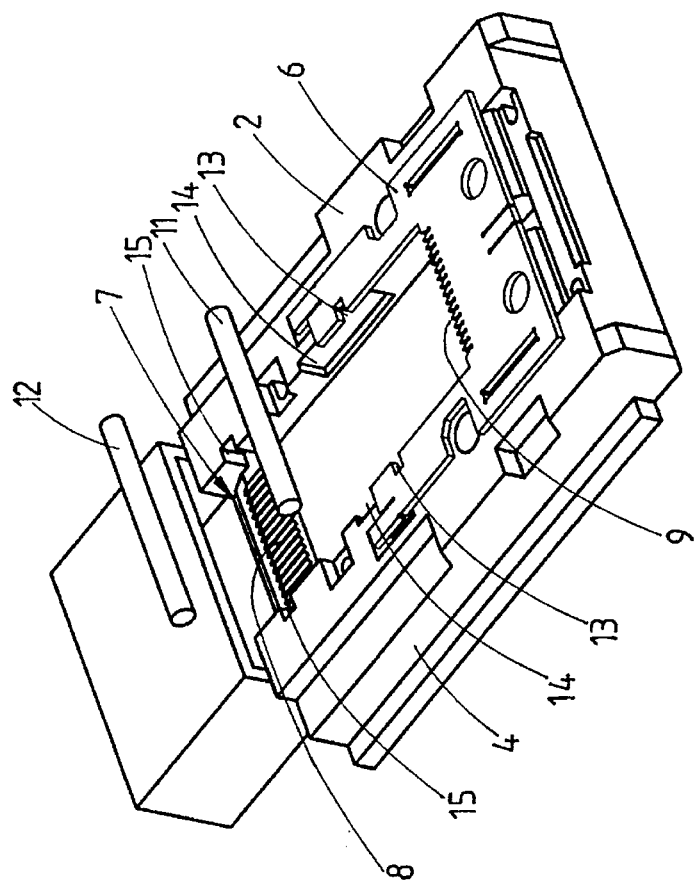
FIG. 2 shows a perspective view of a second embodiment of the alignment piece according to the invention to be used in a free connector.

FIGS. 1 and 2 show alignment pieces 1 and 2, respectively, for optical conductors, said alignment pieces each comprising a support plate 3 and 4, respectively and a guiding plate 5 and 6, respectively. The support plates 3, 4 are made of plastic material, for example, by usual techniques, whereas the guiding plates 5, 6 are made with very high accuracy, for example by means of the LIGA technique. For a further explanation of the alignment pieces 1, 2 reference is made to the earlier international patent application PCT/EP95/02403. The alignment piece is adapted to be embedded in a printed circuit board, whereas the alignment piece 2 is to be used in a connector to be connected to a flat cable or a flexible printed circuit board.

Each alignment piece comprises a plurality of alignment channels 7 for the optical conductors. In the embodiments shown the alignment channels have a part 8 extending in the support plate 3 and 4, respectively, whereas the ends of the alignment channels 7 are formed as V-shaped grooves in the guiding plate 5 and 6, respectively. These ends 9 of the alignment channels determine the location of the contact pads of the optical conductors made by polishing as further described in the above-mentioned international patent application PCT/EP95/02403.

Figure 3:
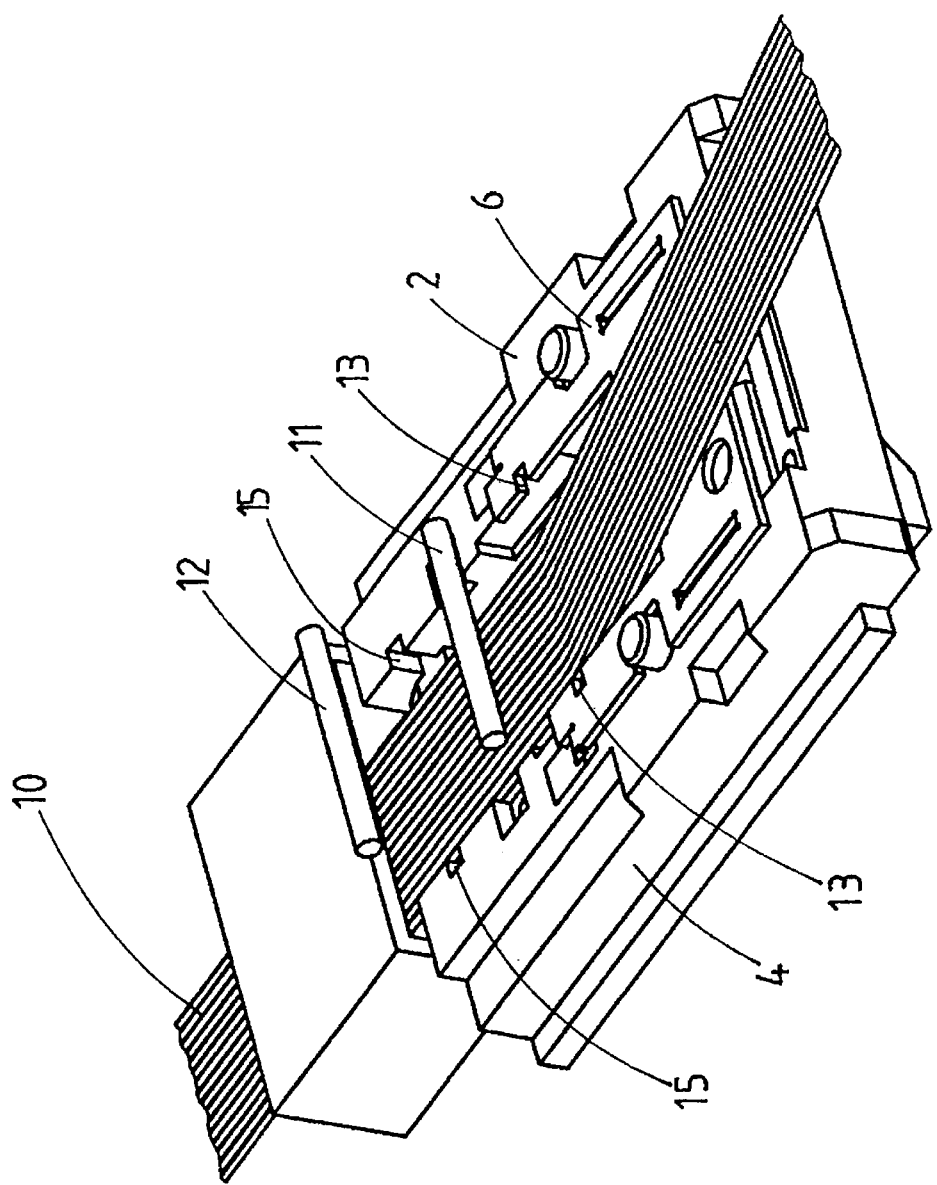
FIG. 3 shows a perspective view of the alignment piece of FIG. 2, wherein the optical conductors are located in the alignment piece and both positioning elements are shown separated from the alignment piece.

FIG. 3 shows the alignment piece 2 of FIG. 2, wherein optical conductors 10 are located in the alignment channels 7. It will be understood that optical conductors can be located in the alignment piece 1 in a corresponding manner. In order to guarantee a good connection between the optical conductors of the alignment piece 1 and the optical conductors of the alignment piece 2, it is of importance that the angle of inclination of the conductors in the alignment pieces 1, 2 is established with high accuracy. In this embodiment the angle of inclination desired is 14°. In order to determine the angle of inclination of the optical conductors 10 in the alignment piece 1, 2 with very high accuracy, a first positioning element 11 and a second positioning element 12 are used according to the invention. These positioning elements 11, 12 are made with sufficiently high accuracy and consist in the described embodiments of a round rod which is mounted in the alignment piece 1 and 2, respectively, after applying the conductors 10.

As shown in the drawings, a first positioning means is provided for the first positioning element 11, said first positioning means including two recesses 13. These recesses 13 are formed in the guiding plate 5, 6 and are therefore lying at a very accurately predetermined location with respect to the ends 9 of the alignment channels 7. The first positioning element 11 can be pushed under the guiding plate 5, 6 through recesses 14 in the support plate 3, 4 and can thereby be located in the recesses 13 in the guiding plate 5, 6. When the positioning element is lying at its location in the recesses 13, the positioning element 11 engages the conductors 10 with a supporting zone.

Figure 4:
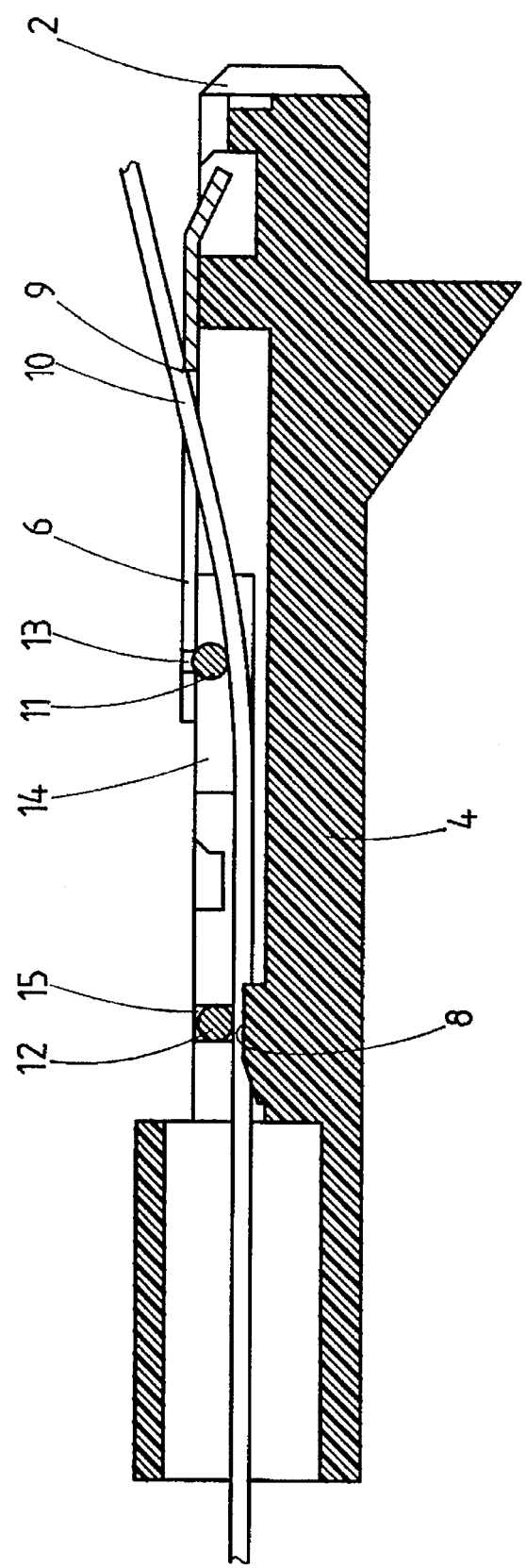
FIG. 4 shows a longitudinal section of the alignment piece of FIG. 3, wherein the positioning elements are mounted in the alignment piece.

A second positioning means is formed in the support plate 3, 4 for the second positioning element 12, said second positioning means including two slots 15. These slots are located at the parts 8 of the alignment channels 7 in the support plate 3, 4. As shown in the section of FIG. 4, a supporting zone of the second positioning element 12 presses the optical conductors 10 in the alignment channel parts 8 of the support plate 3, 4. Thereby this second positioning element 12 together with the slots 15 determines the distance between the point in which the positioning element 12 engages the conductors 10, and the ends 9 of the alignment channels 7 as well as the height difference between this engaging point and these ends 9. Both positioning elements 11, 12 and the ends 9 of the alignment channels 7 together determine the angle of inclination of the optical conductors 10 in the alignment piece 1, 2. In this manner the angle of inclination is determined with very high accuracy.

In the described embodiments of the alignment piece according to the invention the alignment piece comprises a support plate and a guiding plate made as separate parts. Within the scope of the invention it is however also possible to manufacture the alignment piece with support plate and guiding plate as a unit. When it is indicated in the specification and claims that the alignment piece comprises a support plate and a guiding plate these parts can therefore be made as a unit.

The invention is not restricted to the above-described embodiments which can be varied in a number of ways within the scope of the claims.

What is claimed is:

1. Alignment piece for optical conductors, comprising a support plate, a guiding plate manufactured with very high accuracy, one or more alignment channels for the conductors, said alignment channels having ends formed in the guiding plate, a first positioning element and a first positioning means formed in the guiding plate and holding the first positioning element at a predetermined location with respect to the ends of the alignment channels, wherein the first positioning element has a supporting zone engaging the conductors, characterized by a second positioning element and a second positioning means formed in the alignment piece at the side of the first positioning element opposite of the ends of the alignment channels and holding the second positioning element at a predetermined location with respect to the ends of the alignment channels, wherein the second positioning element has a supporting zone clamping the conductors in the alignment piece, wherein the supporting zones of both positioning elements and the ends of the alignment channels determine the angle of inclination of the conductors in the alignment piece.

2. Alignment piece according to claim 1, wherein the second positioning element with its supporting zone presses the conductors into the alignment channels.

3. Alignment piece according to claim 1, wherein the second positioning means comprises a slot in the support plate at both sides of the alignment channels, wherein each end of the second positioning element is fittingly received in a corresponding slot.

4. Alignment piece according to claim 1, wherein the second positioning element is made as a round rod with a predetermined diameter.

* * * * *